March 12, 1957  C. S. BOHMER  2,784,636
THREADED SHEET METAL EXPANSION SLEEVE
AND EXPANDER BOLT THEREFOR
Filed Dec. 29, 1951
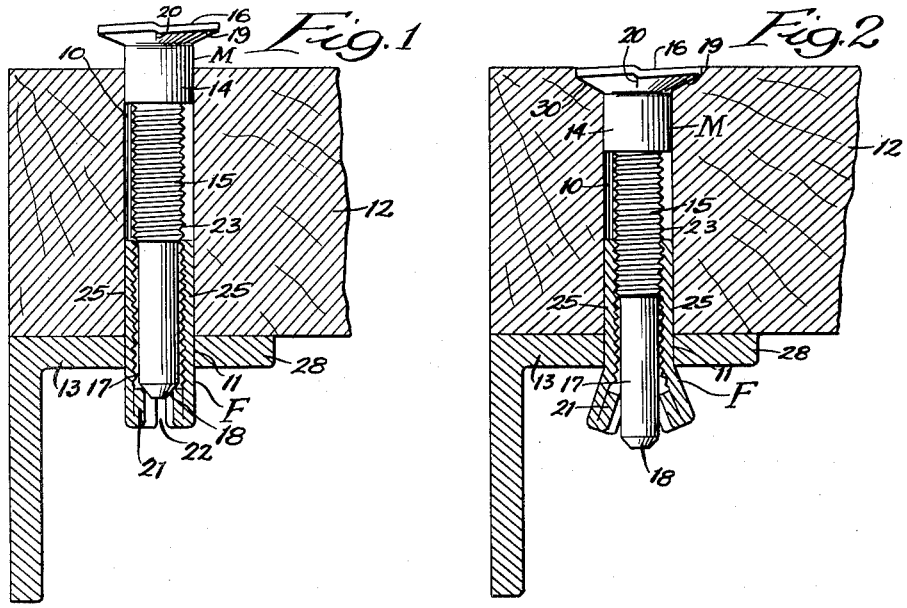
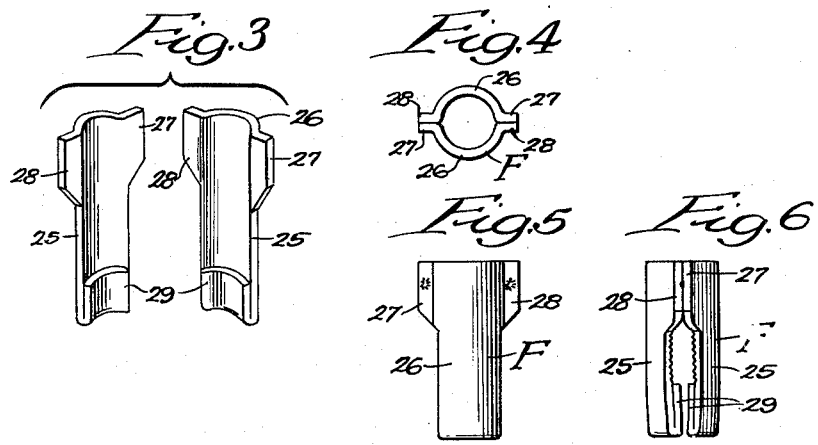
INVENTOR:
Charles S. Bohmer,
BY
Dawson & Ooms,
ATTORNEYS.

United States Patent Office 2,784,636
Patented Mar. 12, 1957

2,784,636

THREADED SHEET METAL EXPANSION SLEEVE AND EXPANDER BOLT THEREFOR

Charles S. Bohmer, Hillsboro, Ill.

Application December 29, 1951, Serial No. 264,163

5 Claims. (Cl. 85—2.4)

This invention relates to a fastening device adapted particularly for use in the manner of a bolt and nut arrangement but where access cannot readily be had to one side of the parts to be joined for effecting the assembled relation and it relates more particularly to an improvement in a fastening device of the type described in my copending application, Ser. No. 184,421, filed on September 12, 1950, now Patent Number 2,701,398, of which this is a continuation-in-part.

It is an object of this invention to produce a fastening device which is simple in construction and easy in operation for effecting an assembled relation securing parts together where access to one side is not available and it is a related object to provide a new and improved method and elements for producing same.

Another object is to produce a fastening device of the type described wherein the parts of the fastening device when in their assembled relation are substantially completely concealed and it is a related object to produce a bolt member for use in same which forms its own countersink upon actuation to the assembled relation thereby to simplify the use thereof and improve the appearance of the assembly.

These and other objects of this invention will hereinafter appear and for purposes of illustration, but not of limitation, an embodiment of this invention is shown in the accompanying drawing in which:

Figure 1 is an elevational view partially in section showing the arrangement of elements embodying features of this invention when partially actuated to their assembled relation for securing various members together;

Figure 2 is an elevational view partially in section corresponding to that of Figure 1 but showing the parts in their final position of adjustment for effecting the assembled relation;

Figure 3 is a perspective view of the parts used in forming a nut member embodying features of this invention;

Figure 4 is a top plan view of the nut member formed by the parts shown in Figure 3;

Figure 5 is a front elevational view of the nut member shown in Figure 4, and

Figure 6 is a side elevational view of the same nut member.

As shown in the drawing, a fastening device embodying features of this invention comprises a male or bolt member M and a female or nut member F adapted to be joined for insertion together through registered openings 10 and 11 formed in the parts to be secured together, such as a wooden stud 12 adapted to be positioned upon a supporting angle iron 13, and dimensioned to correspond to the outer diameter of the female nut member. The female member F is provided with means which preferably extends throughout registered openings to the blind side and which cooperates with the male bolt member M upon actuation toward the assembled relation to spread portions thereof whereby the through extending end portion becomes enlarged to a dimension greater than the openings through which it was originally inserted so as to prevent retrograde movement.

The male member M is in the form of a bolt having a shank 14 which may be threaded throughout but is preferably formed with a threaded section 15 adjacent the head 16 and an unthreaded end portion 17 of smaller dimension having a tapered end 18 to provide a cam surface for actuation of the type which will hereinafter be described for spreading the through-extending end portion of the female member. The head portion 16 which is of considerably larger dimension than the shank is provided with a socket, groove or other means in the upper face thereof for receiving a tool by which positive turning movement may be effected.

An important concept of this invention resides in the construction on the underside 19 of the head 16 which is tapered upwardly and outwardly towards the edge and is provided with one or more radially extending cutting edges 20. Cutting edges of the type described may be formed as by striking portions of the head downwardly along substantially radial lines thereby to form a tool on the underside of the head which drills a countersink in the edge portion of the stud immediately adjacent the opening 10 in which the head may seat when actuated to the assembled relation. It is preferred that the depth of the cutting edge increase towards the outside and that it trail the leading inner edge so as to deliver the material cut from the surrounding medium to the outside.

The female nut member F comprises an elongate cylindrical section or sleeve having outwardly extending anchoring flanges integral with the upper end and formed to be split along its side wall from the bottom edge upwardly through the major portion thereof. The bore 23 extending through the sleeve is of smaller dimension than the bolt at the lower end 22 but corresponds to the dimension thereof through the remainder and is threaded at least in part for threaded engagement with the bolt for actuation therethrough.

An important feature of this invention resides in the construction of the female member whereby it may be formed of a pair of identical parts which may be economically and simply fabricated in large numbers of sheet metal by stamping or by casting. Each part comprises an elongate member 25 having a curvature corresponding with the bolt no portion of which is greater than 180° but preferably with all but the upper end portion being less than a semi-circular section. The upper portion 26 of semi-circular section is formed with a pair of flanges 27 and 28 extending outwardly therefrom in parallel relation so as to come face to face with corresponding flanges in the other member for joinder together as by welding, riveting or the like in effecting an assembled relation to form the cylindrical section or sleeve. The lower end portion 29 of each part is doubled up against the inner wall to provide the bore 22 of smaller diameter when in assembled relation whereby the end portions are engaged by the cam sections 18 of the bolt member for spreading the corresponding portions thereof when said bolt member is actuated into the space therebetween. The joined flanges provide ears which are adapted to extend outwardly and anchor in the surrounding medium when in the assembled relation to prevent turning movement of the nut member during actuation of the bolt member to its position of use.

By way of illustration, use of the fastening device will be described in securing a wooden stud 12 onto the upper shelf 28 of an angle iron 13 to which access cannot be had. Openings 10 and 11 corresponding in dimension to the sleeve section are drilled through the stud and shelf. The male member is partially threaded into the sleeve so that the overall length of the male member and sleeve is greater than the length of the registered openings and then the assembly is forced through the openings so that the lower end portion of the sleeve to include the upturned ends 29 extends through the openings while the head 16 of the male member extends from the opposite end or is otherwise accessible for actuation by a turning tool. It may be necessary to force the sleeve through the stud 12 to the desired position of use because the laterally extending joined flanges 27 and 28 are adapted to become embedded within the surrounding medium of the stud to prevent rotational movement whereby the male member may be turned relative to the sleeve for actuation of the shank downwardly through the sleeve into engagement with the upturned ends 29 for camming the through-extending portion outwardly beyond the dimension of the opening.

As the bolt member passes downwardly through the sleeve to position of use, the underside 19 of the head engages the edge portion of the stud surrounding the opening in a manner to shear away portions thereof by the cutting edges during cutting movement to form its own countersink 30 in which the head becomes seated thereby substantially completely to conceal the fastening device and avoid protruding sections or edges.

It will be understood that changes may be made in the details of construction, arrangement and operation without departing from the spirit of the invention, especially as defined in the following claims.

I claim:

1. A fastener for insertion into aligned holes in a yieldable facing member and a rigid backing member to secure the facing member to the backing member, said fastener comprising, in combination, a bolt having a shank and a head at one end of said shank, said shank having a reduced end portion at the opposite end thereof, said reduced end portion having a tapered nose, said shank having a threaded portion of greater diameter than said reduced portion and extending from said reduced portion toward said head, and a nut member comprising a sheet metal sleeve having a pair of opposed cylindrical curved half-shell elements, said sleeve having first and second opposite ends with said shank of said bolt disengageably received in said first end, each of said half-shell elements comprising a substantially semi-cylindrical portion, a pair of longitudinally extending generally radial flanges projecting outwardly from the longitudinal margins of said semi-cylindrical portion and extending from said first end of said sleeve part way toward said second end thereof, and an end portion at said second end of said sleeve and doubled back inside said sleeve and toward said first end thereof, said half-shell elements being disposed in opposed relation with said flanges rigidly joined in aligned face-to-face position and with said doubled back end portions defining opposed inward projections at said second end of said sleeve, said sleeve being adapted to be driven through the hole in the facing member to embed said flanges in the facing member and thereby hold said sleeve against rotation therein, said sleeve having split finger portions defined by the portions of said half-shell elements extending between said flanges and said second end of said sleeve, said finger portions being adapted to be inserted through the hole in the backing member with said flanges seated against said backing member, said sleeve having internal threads therein extending from said first end toward said second end thereof for receiving the threaded portion of said bolt, said tapered nose of said bolt being engageable with said doubled back end portions of said half-shell elements to expand said finger portions adjacent said second end of said sleeve and behind the backing member to retain said sleeve against withdrawal therefrom.

2. A fastener as claimed in claim 1, in which welded joints are provided to secure said flanges of said half-shell elements together in abutting face-to-face relation.

3. An expansible nut member for insertion, in cooperative relation with a threaded bolt, into aligned holes in a yieldable facing member and a rigid backing member to secure the facing member to the backing member, said nut member comprising a sheet metal sleeve having a pair of opposed cylindrically curved half-shell elements, said sleeve having first and second opposite ends, said first end being adapted to receive the bolt initially, each of said half-shell elements comprising a substantially semi-cylindrical portion, a pair of longitudinally extending generally radial flanges projecting outwardly from the longitudinally margins of said semi-cylindrical portion and extending from said first end of said sleeve part way toward said second end thereof, and an end portion at said second end of said sleeve and doubled back inside said sleeve and toward said first end thereof, said half-shell elements being disposed in opposed relation with said flanges rigidly joined in aligned face-to-face position and with said doubled back end portions defining opposed inward projections at said second end of said sleeve, said sleeve being adapted to be driven through the hole in the facing member to embed said flanges in the facing member and thereby hold such sleeve against rotation therein, said sleeve having split finger portions defined by the portions of said half-shell elements extending between said flanges and said second end of said sleeve, said finger portions being adapted to be inserted through the hole in the backing member with said flanges seated against said backing member, said sleeve having internal threads therein extending from said first end toward said second end thereof and adapted to reveive the bolt, said doubled back end portions of said half-shell elements being adapted to be engaged by the bolt to expand said finger portions adjacent said second end of said sleeve and behind the backing member to retain said sleeve against withdrawal therefrom.

4. An expansible nut member as claimed in claim 3, in which welded joints are provided to secure said flanges of said half-shell elements together in abutting face-to-face relation.

5. A fastener for insertion into aligned openings in a facing member and a rigid backing member to secure the facing member to the backing member, said fastener comprising in combination a bolt having a shank and a head at one end of the shank, said shank having a reduced end portion in the opposite end thereof, said reduced end portion having a tapered nose, said shank having a threaded portion of greater diameter than the reduced portion and extending from said reduced portion towards said head, and a nut member comprising a sheet metal sleeve having opposed semi-cylindrical elements, said sleeve having first and second opposite ends with said shank of said bolt disengageably received in said first end, a pair of longitudinally extending generally radial flanges projecting outwardly from longitudinal margins of said semi-cylindrical elements and extending from said first end of said sleeve part way toward said second end thereof, and an end portion at said second end of said sleeve doubled back inside said sleeve toward said first end thereof, said semi-cylindrical elements being disposed in opposed relation to form a cylindrical section therebetween with said flanges rigidly joined in aligned face to face relation and with said doubled back end portions defining opposed inward projections at said second end of said sleeve, said sleeve being adapted to be driven through the openings in the facing member to embed said flanges in the facing member and thereby hold said sleeve against relative rotational movement, said sleeve having split finger portions defined by the portions of said semi-cylindrical elements extending between said flanges and said second end of said sleeve, said finger portions being adapted to be inserted through the opening in the backing member, said sleeve having internal threads therein for receiving the threaded portion of said bolt, said tapered nose of said bolt being engageable with said doubled back end portions of said semi-cylinderical elements to expand said finger portions adjacent said second end of said sleeve and behind the backing member to militate against withdrawal of the sleeve from its assembled relation in the openings.

References Cited in the file of this patent

UNITED STATES PATENTS

| | | |
|---|---|---|
| 301,290 | Smith | July 1, 1884 |
| 917,907 | Taylor | Apr. 13, 1909 |
| 985,761 | Ogden | Feb. 28, 1911 |
| 1,372,035 | Ogden | Mar. 22, 1921 |
| 1,596,044 | Johnson | Aug. 17, 1926 |
| 1,784,755 | Rosenberg | Dec. 9, 1930 |
| 1,814,965 | Rosenberg | July 14, 1931 |
| 2,106,595 | Draving | Jan. 25, 1938 |
| 2,208,779 | Tinnerman | July 23, 1940 |
| 2,250,787 | Anderson | July 29, 1941 |
| 2,314,770 | Cogswell | Mar. 23, 1943 |
| 2,335,769 | Kissling | Nov. 30, 1943 |
| 2,596,952 | Crowther | May 13, 1952 |
| 2,616,328 | Kingsmore | Nov. 4, 1952 |
| 2,701,398 | Bohmer | Feb. 5, 1955 |

FOREIGN PATENTS

| | | |
|---|---|---|
| 13,357 | Great Britain | July 24, 1900 |
| 473,661 | Great Britain | Oct. 18, 1937 |